C. HORINE.
BLOW-OUT PATCH FOR PNEUMATIC TIRES.
APPLICATION FILED DEC. 11, 1919.
1,359,380.
Patented Nov. 16, 1920.
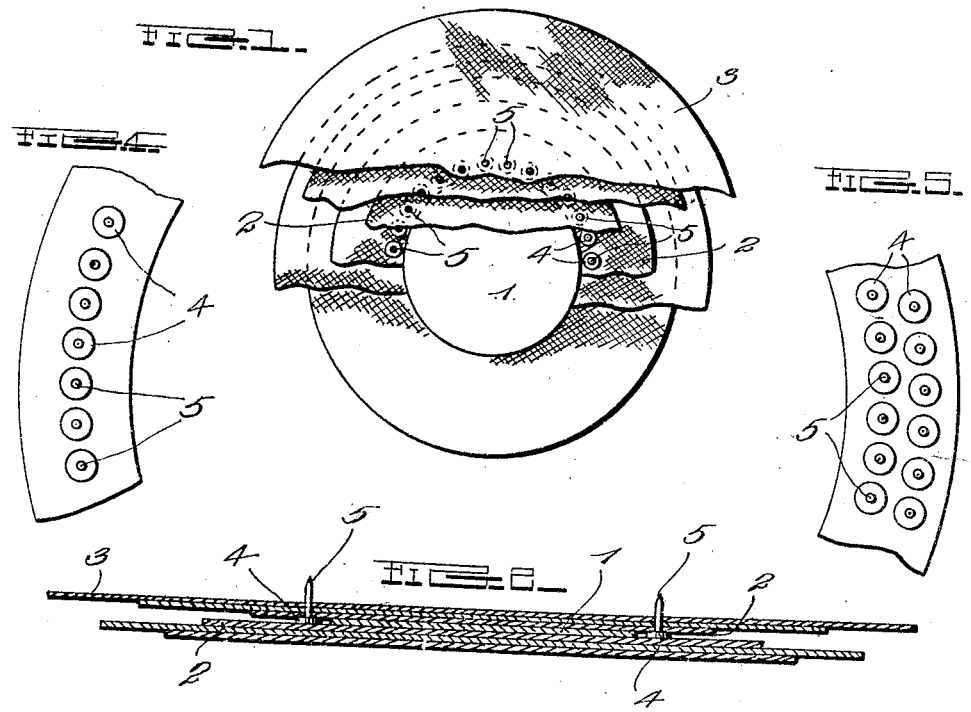
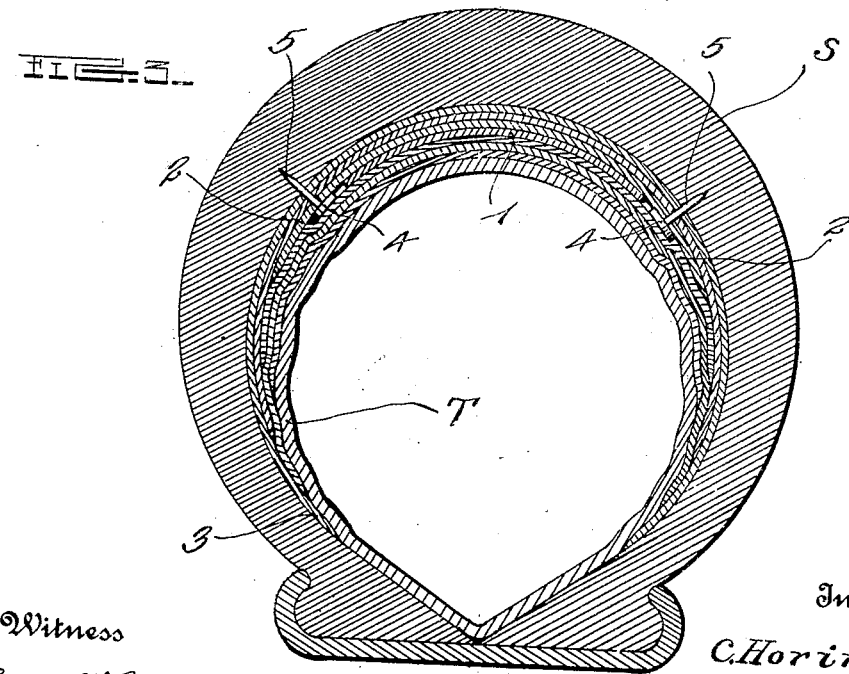
Witness
George W. Giovanetti
Inventor
C. Horine
By H. B. Willson & Co.
Attorneys

UNITED STATES PATENT OFFICE.

CLARENCE HORINE, OF LIMA, OHIO.

BLOW-OUT PATCH FOR PNEUMATIC TIRES.

1,359,380.  Specification of Letters Patent.  Patented Nov. 16, 1920.

Application filed December 11, 1919. Serial No. 344,071.

*To all whom it may concern:*

Be it known that I, CLARENCE HORINE, a citizen of the United States, residing at Lima, in the county of Allen and State of Ohio, have invented certain new and useful Improvements in Blow-Out Patches for Pneumatic Tires; and I do declare the following to be a full, clear, and exact description of the invention, such as will enable others skilled in the art to which it appertains to make and use the same.

This invention relates to improvements in blow-out patches for use on pneumatic tires.

The primary object is to provide a simple and practical blow-out patch so constructed as to yield to conform with every sudden temporary change in the shape of the tire shoe, due to striking obstacles in the roadway or to partial deflation.

With the above and other objects in view, the invention consists of certain novel features of construction and the combination and arrangement of parts as will be more fully described and claimed.

I attain these objects by constructing the patch as illustrated in the accompanying drawings, in which—

Figure 1 is a plan view of the patch before being bent into shape, parts being illustrated in section;

Fig. 2 is a transverse section of the tire patch;

Fig. 3 is a sectional view of a tire showing the patch applied thereto;

Fig. 4 is a detail view of a tack holding strip which may be used on the patch; and, Fig. 5 is a similar view showing a different positioning of the tacks.

Similar numerals of reference designate similar parts throughout the several views.

Reference is now had to the drawing in which a pneumatic tire casing S and an inner tube T is shown provided with a blow out patch comprising a flexible inner sheet or plate 1 formed of metal, leather, fiber, especially treated rubber or other suitable material. Covering the opposite faces of the sheet or plate 1 is a pair of fabric sheets 2, said sheets 2 extending out from the sheet or plate 1 a sufficient distance to permit mounting therein, a plurality of closely spaced puncture resisting disks. The sheets 2 are considerably more flexible than the plate 1, for obvious reasons. The inner sheet or plate 1 is curved to conform with the curvature of the tire casing in which it is to be used.

While I may use any number of these flexible fabric sheets 2 I preferably employ the number illustrated in Figs. 2 and 3 of the drawing, the sizes of which vary so that the peripheries of the fabric disks upon one side of the central disk are positioned in staggered relation to the peripheries of the disks upon the opposite side of the central disk as clearly shown in Fig. 1. Therefore when they are cemented together and prepared for positioning in a tire casing the edge of the entire patch will taper in such a manner as to eliminate forming a sharp shoulder which would cut the inner tube. As shown in Fig. 3 the outer fabric sheet 3 is of greater diameter than the remaining sheets, each of which is reduced in area to such an extent that the inner tube when inflated will be in contact with a comparatively smooth surface. The edge of each of these sheets is tapered as illustrated in Fig. 3, thereby serving to form a smoother surface for contacting the inner tube.

Disposed in a plane with the central plate 1 and closely spaced from the edge thereof are a plurality of annularly spaced disks 4, said disks carrying sharpened shanks 5 which project outwardly through several of the fabric sheets and are adapted to project into the inner face of the tire casing S when the patch is being used. If preferred I may mount these disks and sharpened shanks in suitable strips as illustrated in Figs. 4 and 5, said disks being arranged close to each other so as to assist the central plate 1 in preventing puncture of the inner tube T.

In a tire shoe, it is customary to form the side walls so that they taper and decrease in thickness toward the bead and since this patch is formed with the thickest portion disposed adjacent the tread of the casing and with the thinner portions extending around between tube and casing it is seen that the flexibility of this patch will increase toward the bead of the tire in substantially the same proportion as does the flexibility of the casing itself.

Although I have illustrated the patch in Fig. 1 as being circular in shape it is understood that I may manufacture them in any other preferred shape.

From the foregoing description taken in connection with the accompanying drawings, the construction and operation of the invention will be readily understood without requiring a more extended explanation.

Various changes in the form, proportion and minor details of description may be resorted to without departing from the principle or sacrificing any of the advantages of the claimed invention.

I claim:

1. A blow-out patch having a central disk of flexible material, outer disks positioned upon opposite sides of the central disk and having greater flexibility than the central disk, the outer disks being of greater diameter than the central disk and varying in diameter, the outer disks upon one side of the central disk contacting with each other and of varying diameters and extending in spaced relation to the disks upon the opposite side of the central disk, and metal disks positioned about the central disk and having anchoring prongs extending through the outer disks upon one side of the central disk.

2. A blow-out patch having a central disk, disks forming inner and outer series of disks upon opposite sides of the central disk, the disks of each series being of greater diameter than the central disk and in contacting relation with each other and of varying sizes, the peripheries of the disks of one series being positioned in staggered relation to the peripheries of the disks forming the second series.

In testimony whereof I have hereunto set my hand.

CLARENCE HORINE.